(12) United States Patent
Stites et al.

(10) Patent No.: US 7,736,242 B2
(45) Date of Patent: Jun. 15, 2010

(54) SYSTEM FOR DETERMINING PERFORMANCE CHARACTERISTICS OF A GOLF SWING

(75) Inventors: John T. Stites, Weatherford, TX (US); Gary Tavares, Azle, TX (US); Carl Madore, Portland, OR (US); Michael Kelly, Portland, OR (US); Raymond J. Sander, Mount Vernon, OH (US); Jeffrey A. Hadden, Columbus, OH (US); Jeffrey R. Held, Columbus, OH (US); Garrick L. Meanle, Columbus, OH (US); Gregory S. Kramer, Hilliard, OH (US); Chad E. Bouton, Delaware, OH (US); Clifford N. Dodson, Dublin, OH (US); Patrick K. Hoffman, Columbus, OH (US)

(73) Assignee: NIKE, Inc., Beaverton, OR (US)

( * ) Notice: Subject to any disclaimer, the term of this patent is extended or adjusted under 35 U.S.C. 154(b) by 1223 days.

(21) Appl. No.: 10/806,508

(22) Filed: Mar. 23, 2004

(65) Prior Publication Data

US 2005/0215340 A1 Sep. 29, 2005

(51) Int. Cl.
*A63B 57/00* (2006.01)
*A63B 53/16* (2006.01)
(52) U.S. Cl. .................. 473/221; 473/223; 473/233
(58) Field of Classification Search .......... 473/233, 473/219, 221–223, 226–227
See application file for complete search history.

(56) References Cited

U.S. PATENT DOCUMENTS

| | | | |
|---|---|---|---|
| 1,444,842 A | * | 2/1923 | Lagerblade ................. 473/309 |
| 3,226,704 A | * | 12/1965 | Petrash ....................... 473/224 |
| 3,707,857 A | | 1/1973 | Wigfall |
| 3,788,647 A | | 1/1974 | Evans |
| 3,792,863 A | * | 2/1974 | Evans ......................... 473/223 |
| 3,806,131 A | | 4/1974 | Evans |
| 3,945,646 A | | 3/1976 | Hammond |
| 4,088,324 A | | 5/1978 | Farmer |
| 4,337,049 A | | 6/1982 | Connelly |
| 4,523,759 A | | 6/1985 | Igarashi |
| 4,527,156 A | | 7/1985 | Nawrocki et al. |
| 4,759,219 A | | 7/1988 | Cobb et al. |

(Continued)

FOREIGN PATENT DOCUMENTS

DE 10055989 6/2002

(Continued)

OTHER PUBLICATIONS

International Search Report for PCT/US2005/009376 mailed Oct. 11, 2006.

(Continued)

*Primary Examiner*—Peter DungBa Vo
*Assistant Examiner*—Jasson H Yoo
(74) *Attorney, Agent, or Firm*—Banner & Witcoff, Ltd.

(57) ABSTRACT

An instrumented golf club system and methods are disclosed. A variety of golf swing parameters are measured by the instrumented golf club and wirelessly transmitted to a portable computer device. The portable computer device generates a user interface that displays the golf swing parameters against preferred golf swing parameters. The instrumented golf club system allows a golfer to receive feedback in real time while playing golf.

13 Claims, 11 Drawing Sheets

U.S. PATENT DOCUMENTS

| | | |
|---|---|---|
| 4,779,555 A | 10/1988 | Hong |
| 4,870,868 A | 10/1989 | Gastgeb et al. |
| 4,898,389 A | 2/1990 | Plutt |
| 4,940,036 A | 7/1990 | Duplat |
| 4,991,850 A | 2/1991 | Wilhelm |
| 5,056,783 A | 10/1991 | Matcovich et al. |
| 5,118,102 A | 6/1992 | Bahill et al. |
| 5,209,483 A * | 5/1993 | Gedney et al. ............. 473/223 |
| 5,221,088 A * | 6/1993 | McTeigue et al. ........... 473/201 |
| 5,233,544 A | 8/1993 | Kobayashi |
| 5,332,225 A | 7/1994 | Ura |
| 5,372,365 A | 12/1994 | McTeigue |
| 5,474,298 A | 12/1995 | Lindsay |
| 5,709,610 A | 1/1998 | Ognjanovic |
| 5,779,555 A | 7/1998 | Nomura et al. |
| 5,792,000 A | 8/1998 | Weber et al. |
| 5,864,061 A | 1/1999 | Dilz et al. |
| 5,871,406 A | 2/1999 | Worrell |
| 5,951,410 A | 9/1999 | Butler et al. |
| 6,032,530 A | 3/2000 | Hock |
| 6,045,364 A | 4/2000 | Dugan et al. |
| 6,048,276 A | 4/2000 | Vandergrift |
| 6,196,932 B1 | 3/2001 | Marsh et al. |
| 6,224,493 B1 | 5/2001 | Lee et al. |
| 6,248,021 B1 | 6/2001 | Ognjanovic |
| 6,261,102 B1 | 7/2001 | Dugan et al. |
| 6,402,634 B2 | 6/2002 | Lee et al. |
| 6,441,745 B1 | 8/2002 | Gates |
| 6,459,232 B1 | 10/2002 | Lai |
| 2001/0053720 A1 * | 12/2001 | Lee et al. ..................... 473/223 |
| 2002/0007676 A1 | 1/2002 | Ward |
| 2002/0077189 A1 | 6/2002 | Tuer |
| 2002/0082126 A1 | 6/2002 | Brundage |
| 2002/0123386 A1 | 9/2002 | Perlmutter |
| 2002/0173365 A1 | 11/2002 | Boscha |
| 2003/0032494 A1 | 2/2003 | McGinty et al. |
| 2004/0259651 A1 * | 12/2004 | Storek ........................ 473/131 |

FOREIGN PATENT DOCUMENTS

| | | |
|---|---|---|
| JP | 4-146770 | 5/1992 |
| JP | 2003-24478 | 1/2003 |
| JP | 2005-152321 | 6/2005 |
| WO | WO 01/66196 A | 9/2001 |
| WO | WO 02/35184 A | 5/2002 |

OTHER PUBLICATIONS

International Search Report for PCT/US2005/009375 mailed Feb. 6, 2006.

Notification of Reason for Refusal in related Japanese Patent Application No. 2007-505071, dispatched Feb. 5, 2009.

Communication pursuant to Article 94(3) EPC in related European Patent Application No. 05 732 123.4 dated Nov. 30, 2009, pp. 1-5.

* cited by examiner

SYSTEM FOR DETERMINING PERFORMANCE CHARACTERISTICS OF A GOLF SWING

FIELD OF THE INVENTION

The invention relates to golf clubs. More particularly, the invention provides methods and systems for analyzing performance characteristics of a golf swing.

BACKGROUND OF THE INVENTION

Golf swing analysis clubs and systems exist for measuring characteristics of a golf swing. Existing systems typically include sensors attached to a golf club or external components. The system shown in U.S. Pat. No. 6,441,745, for example, shows a transmitter attached to the shaft of a club and an external head speed sensor that is placed on the ground behind a golf ball. Some of the drawbacks of the system shown in U.S. Pat. No. 6,441,745 are that the transmitter affects the aerodynamics of the golf swing and the required use of an external head speed sensor limits the usability of the system.

Some golf swing analysis systems include removable memory modules. The removable memory module stores golf swing characteristic information and provides the information to a computer after a period of analysis. One drawback of these systems is that they do not provide real time feedback to the golfer. For example, if the removable module stores information during a round of golf, the information is not provided to the golfer until after the round of golf when the memory module is removed and connected to a computer device. As a result, the golfer cannot use the information during the round of golf.

Other golf swing analysis systems include wiring harnesses connecting a golf club to a computer or display device. Because of the restrictions in range of motion imposed by such systems, they are not practical to use on an actual golf course.

Therefore, there is a need in the art for portable golf swing analysis clubs and systems that can be used on a golf course without bulky external equipment and that provide real time feedback to a golfer.

SUMMARY OF THE INVENTION

One or more of the above-mentioned needs in the art are satisfied by the disclosed golf clubs and golf swing analysis systems. The disclosed golf clubs may be self contained and include sensors and transmitters located within the golf clubs. As a result, the golf clubs can be used during a round of golf and do not interfere with the golfer. In certain embodiments, the disclosed golf clubs wirelessly transmit golf swing characteristic data to a portable device, such as a personal digital assistant (PDA) or watch.

In a first embodiment of the invention, a self contained instrumented golf club is provided. The golf club includes a first accelerometer module mounted in a head of the golf club and a second accelerometer module mounted in a shaft of the golf club.

In a second embodiment of the invention, a user interface for displaying golf swing performance information of a golfer is provided. The user interface includes a first section displaying a measured first golf swing parameter at a location along a bar graph to indicate a relationship between a value of the measured first golf swing parameter and a preferred value of the first golf swing parameter.

In yet another embodiment of the invention, a method of providing golf swing data to a golfer is provided. The method includes receiving golf swing data from a self contained instrumented golf club and displaying in real time, on a portable computer device, at least some of the golf swing data in relation to preferred golf swing data.

In other embodiments of the invention, computer-executable instructions for implementing the disclosed methods are stored as control logic or computer-readable instructions on computer-readable media, such as an optical or magnetic disk.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
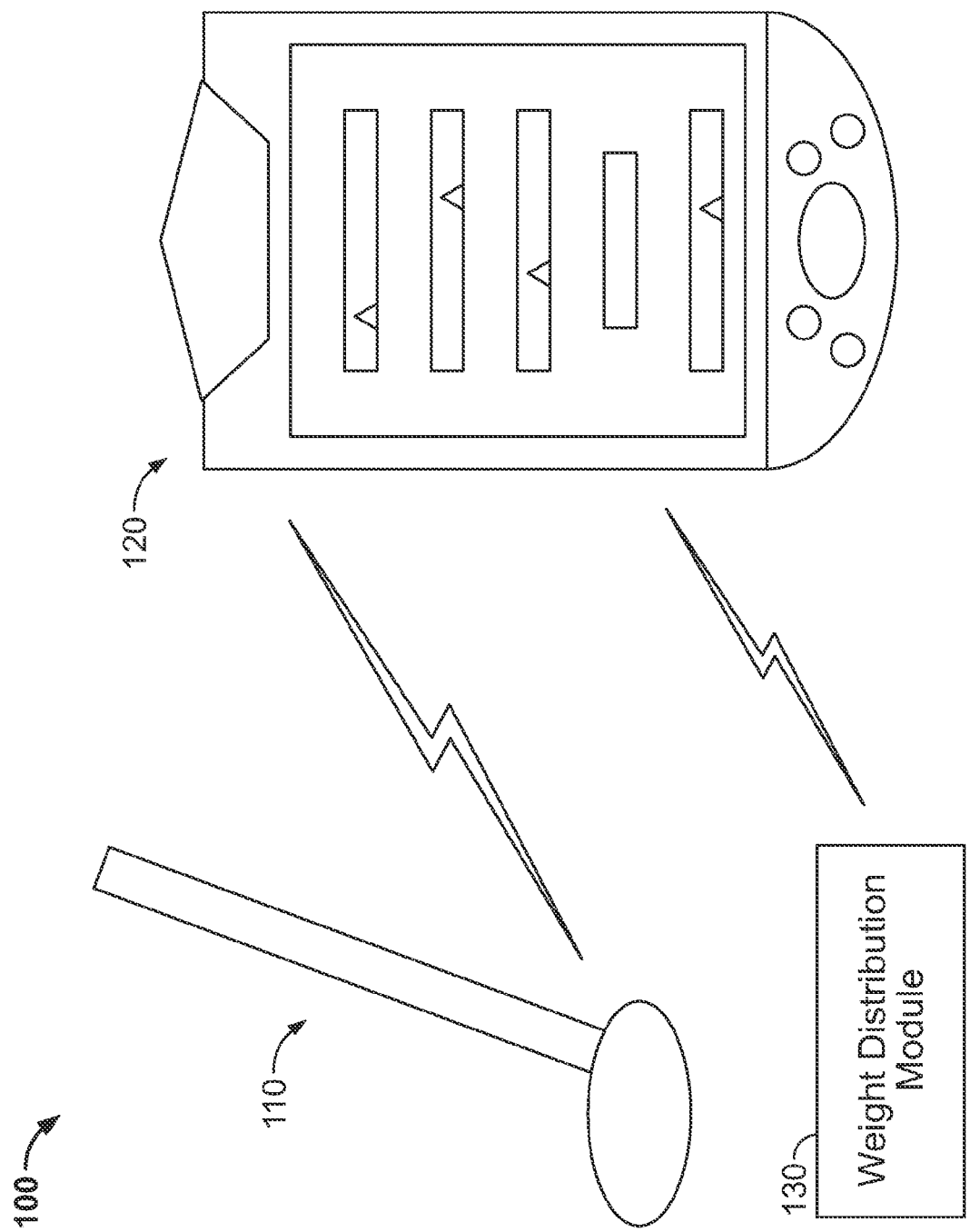
FIG. 1 illustrates a golf swing analysis system, in accordance with an embodiment of the invention.

FIG. 1 illustrates a golf swing analysis system 100 in accordance with an embodiment of the invention. A golf club 110 includes internal sensors (shown in FIG. 2) and wirelessly transmits data to a portable computer device 120. In various embodiments, portable computer device 120 may be implemented with a personal digital assistant (PDA), mobile telephone device, wristwatch or any other device that is portable and capable of processing the received data.

System 100 may also include a weight distribution module 130 for measuring a golfers weight distribution during a golf swing. In one embodiment weight distribution module 130 is implemented with sensors placed within the golfers shoes. The sensors may include strain gauges, conductive ink, piezoelectric devices and/or pressure transducers. The relative pressure applied to each sensor can be used to indicate weight distribution. Weight distribution module 130 also preferably includes a transmission module for wirelessly transmitting data to portable computer device 120.

Figure 2:
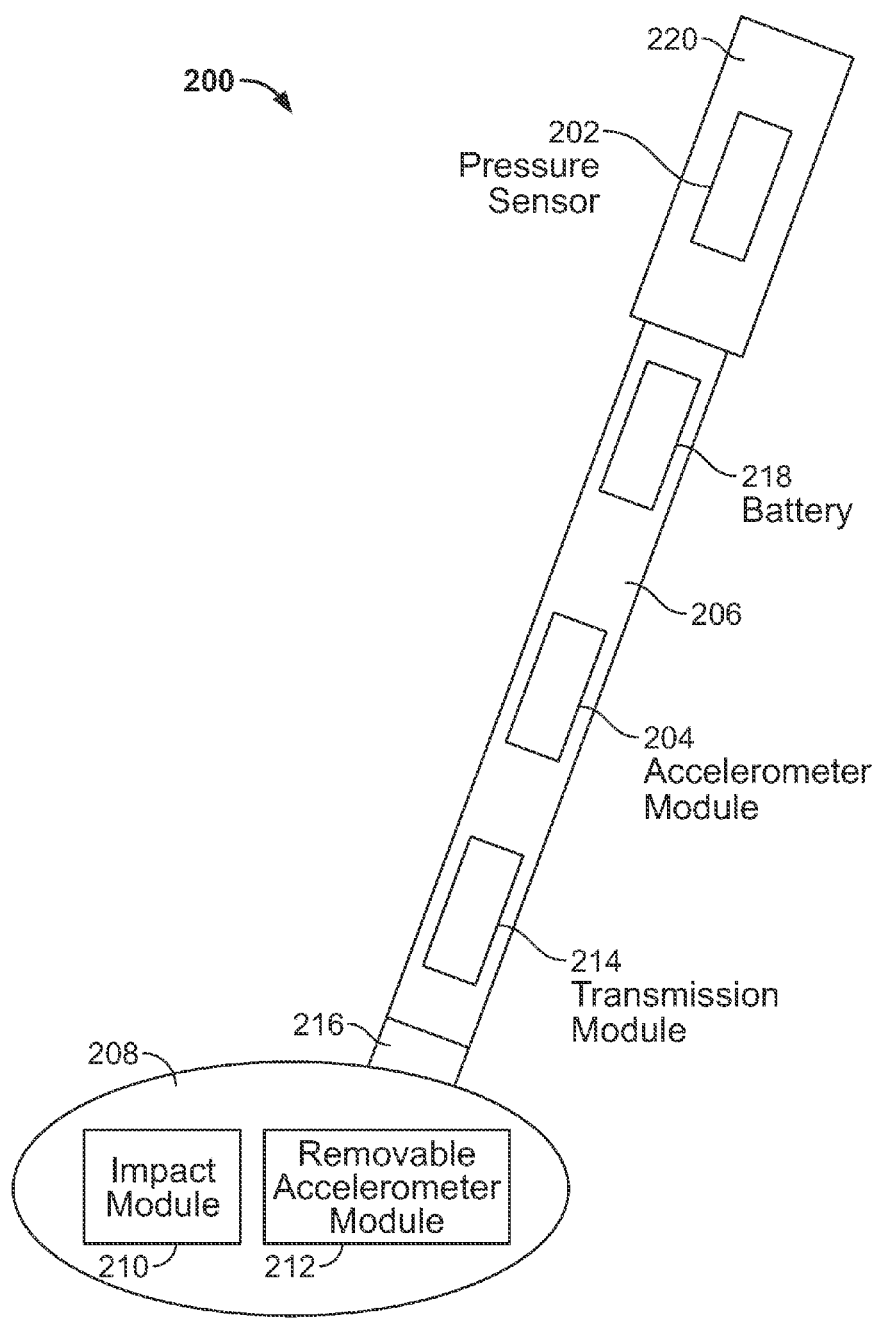
FIG. 2 illustrates an instrumented golf club that includes an accelerometer module, in accordance with an embodiment of the invention.

FIG. 2 illustrates an instrumented golf club 200 in accordance with an embodiment of the invention. Golf club 200 includes multiple sensors for sensing values such as acceleration, velocity, face angle, energy transfer, grip pressure, impact location, temperature and shaft loading. A pressure sensor 202 may be used to measure grip pressure. An accelerometer module 204 may be used to measure acceleration of the shaft 206. Accelerometer module 204 may be implemented with a three-axis accelerometer for measuring acceleration along three orthogonal axes.

A head 208 of golf club 200 may include an impact module 210 for measuring the impact of a golf ball relative to the face of head 208. Impact module 210 may include a strain gauge. Head 208 may also include a removable accelerometer module 212. Accelerometer module 212 may include a three-axis accelerometer for head measuring acceleration along three orthogonal axes. Embodiments that include a removable accelerometer module, as opposed to embodiments that include a module embedded into head 208, provide certain advantages. For example, a single removable accelerometer module may be used for several different clubs and allows a golfer to upgrade or replace the accelerometer module without replacing the entire club.

Data from all of the sensors may be sent to a transmission module 214. Transmission module 214 may be configured to transmit data via an antenna to portable computer device 120 (shown in FIG. 1) using a variety of conventional protocols and transmitters, such as those using Bluetooth wireless technology. In one embodiment of the invention, ferrule 216 is used as an antenna. Ferrule 216 may be formed of a metal material or other type of antenna material. In another embodiment, shaft 206 may function as an antenna. An antenna may also be plated onto shaft 206, embedded under grip 220 or placed in any other location that does not interfere with a golf swing. A battery 218 is included to provide power to transmission module 214 and any sensors that require an electrical input. Battery 218 is shown as inserted in shaft 206. In other embodiments the battery may be located at the end of the grip 220, within removable accelerometer module 212 or any other location that allows the battery to be conveniently replaced or recharged.

In one embodiment of the invention, all of the sensors are located within golf club 200 so as to not interfere with the aerodynamics of the club. Golf club 200 may also be configured so that the weights of the included components do not change the balance or center of gravity of the club. Golf club 200 may be a wood, iron, putter or specialty club.

Figure 3:
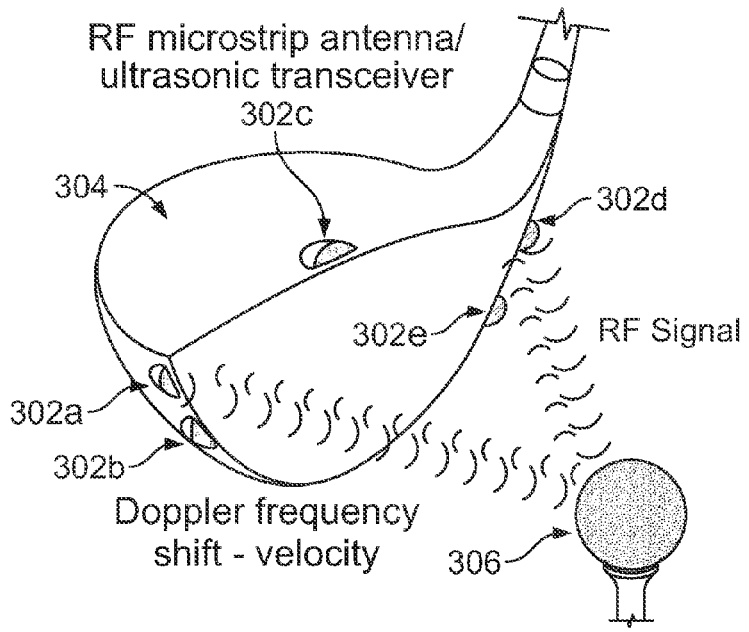
FIG. 3 illustrates an instrumented golf club that includes electromagnetic sensors, in accordance with an embodiment of the invention.

One skilled in the art will appreciate that numerous additional sensors may be used in connection with aspects of the invention. FIG. 3, for example, shows an embodiment in which electromagnetic sensors, such as radio frequency sensors, or ultrasound sensors 302a-302e are attached to a golf club head 304. Sensors 302a-302e may be attached to or embedded in golf club head 304. In one embodiment, sensors 302a-302e are implemented with microstrip antennas. One skilled in the art will appreciate that one or more of sensors 302a-302e may emit electromagnetic radiation or ultrasound waves. Alternatively, electromagnetic radiation may be emitted by another source that may be attached to or embedded within golf club head 304.

When electromagnetic sensors are used, club head speed may be determined by measuring the Doppler frequency shift of waves reflected from a ball 306. Golf club head 304 or another part of the golf club may include a module for determining the Doppler frequency shift. Impact location may be determined by measuring the phase shift of reflected signals from ball 306 just prior to impact, such as 15 cm prior to impact. A frequency of 2 GHz may be used for a wavelength of 15 cm. The phase shifts correspond to distances. The accuracy of the determination of the impact location may be increased by using more sensors. In one embodiment three sensors are used for determining impact location. Swing tempo may be determined by using the sensors as proximity sensors. For example, the sensors may be used to determine when golf club head 304 is in close proximity to ball 306 just prior to back swing and then before impact. The time period between the two measurements corresponds to the swing tempo.

Ultrasound sensors may function in a similar manner. A number of ultrasound sensors, such as 2-5 may be attached to or embedded in the head of a golf club. Club head speed may be determined by measuring a frequency shift in a signal reflected from a ball. For example, with a transducer of 40 kHz, a club head speed of 130 mph would result in a 70 kHz reflection. A number of ultrasound sensors placed around the face of the club, such as two along each side and one on the top, may be used to determine impact location. The time of flight of each signal just prior to impact corresponds to the distance between the ball and the sensor. The individual distances may be used to determine impact location. Ultrasound sensors may also function as proximity sensors to determine swing tempo in the manner described above.

In alternative embodiments, electromagnetic or ultrasound sensors may be placed in or attached to a golfer's shoes to perform the functions similar to those described above. The sensors detect movement of the club head which can be used to determine golf swing parameters.

Figure 4:
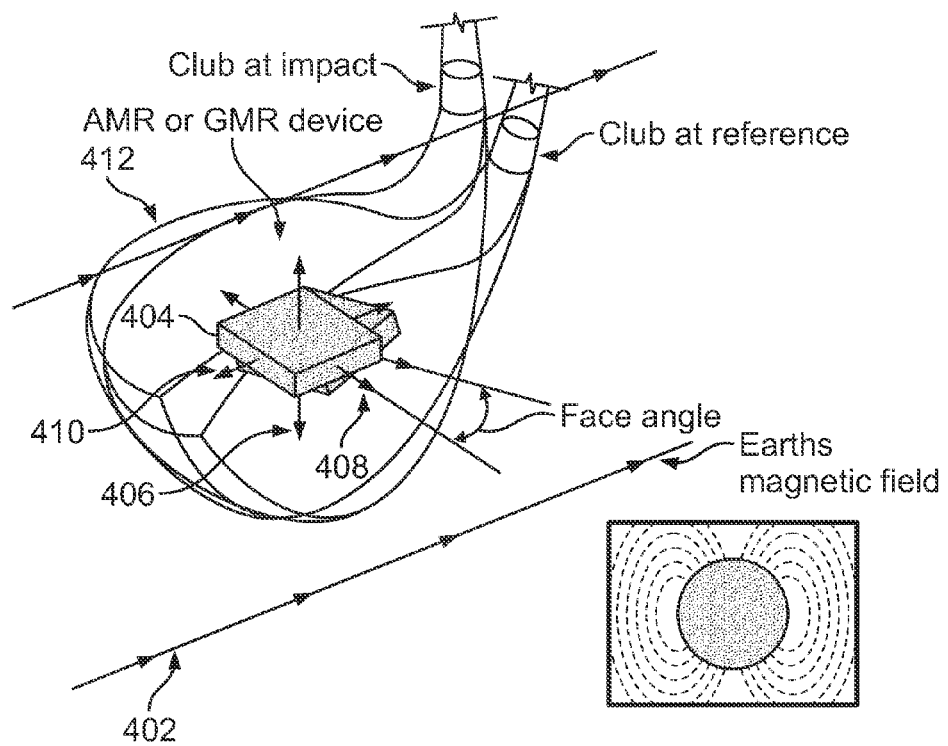
FIG. 4 illustrates an instrumented golf club that includes a magnetic field sensor, in accordance with an embodiment of the invention.

The earth's magnetic field may also be used to determine golf swing parameters. Magnetic field sensors may be attached to or embedded within a golf club to detect components of the earth's magnetic field at different club locations. As shown in FIG. 4, the earth's magnetic field represented by vector 402 is relatively constant in the vicinity of a golfer. A magnetic field sensor 404 resolves magnetic field vector 402 into three component vectors 406, 408 and 410. Magnetic field sensor 404 may be implemented with an anisotropic magnetoresistive (AMR) device, a giant magnetoresistor (GMR) device or other suitable devices. As golf club head 412 moves, magnetic field vector 402 is resolved into component vectors 406, 408 and 410 such that the respective components have different magnitudes. The changing magnitudes of the component vectors may then be used to determine golf swing parameters.

The club head face angle may be determined by first taking a reference measurement of the magnetic field before the back swing and then taking another measurement of the magnetic field just prior to impact. For example, the magnitude of component vectors 406, 408 and 410 will have first values before the back swing and second values just prior to impact. The different component vector values can then be used to determine the face angle. If the magnetic field in the x-y plane is assumed to be 0.3 Gauss, the component X of the field with respect to component vector 408 (x axis) is determined by X=0.3 cos θ and the component Y of the field with respect to component vector 410 (y axis) is determined by Y=0.3 sin θ.

A 1 degree difference would cause a change in the magnitudes of vector components 408 and 410 as follows:

ΔX=0.3(cos θ−cos(θ+1))

ΔY=0.3(sin θ−sin(θ+1))

The smallest change that needs to be detected along each vector component may be determined by taking the derivative of each component and determining were the derivative crosses the 0 axis.

dX/dθ=−0.3 sin θ=0 at θ=0 degrees dY/dθ=0.3 cos θ=0 at θ=90 degrees

The highest resolution in the x-component is needed when the angle rotates from 0 to 1 degree and corresponds to 45.7 μG. The same resolution is needed when the y-component rotates from 89 to 90 degrees.

Swing tempo may be determined by using vector component 406 (z axis) as a tilt sensor. A reference measurement of vector component 406 may be recorded before the back swing. The period required for the club head to return to a position such that the vector component 406 returns to the measured reference value corresponds to the swing tempo. In an alternative embodiment, velocity information may also be just to determine impact time and the resulting swing tempo.

Figure 5:
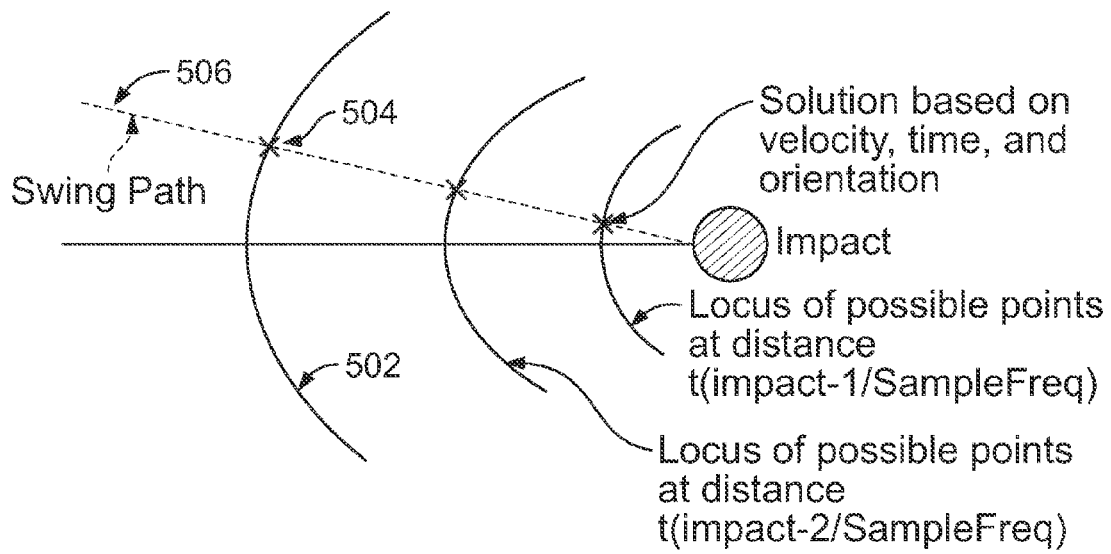
FIG. 5 illustrates how velocity, time and orientation measurements may be used to determine the swing path of a golf club, in accordance with an embodiment of the invention.

Several different measurements may be used to determine the swing path. FIG. 5 shows a diagram of how velocity, time and orientation measurements may be used to determine the swing path. For example, velocity and time information measurements may be used to determine a first locus of points 502. Next, an orientation measurement may then be used to determine a first location 504 along first locus of points 502. The process of identifying club locations may be repeated several times to determine a swing path 506. In one embodiment, measurements are taken at least 1 kHz during a swing. Swing path 506 may be determined relative to a reference orientation and impact location.

Figure 6:
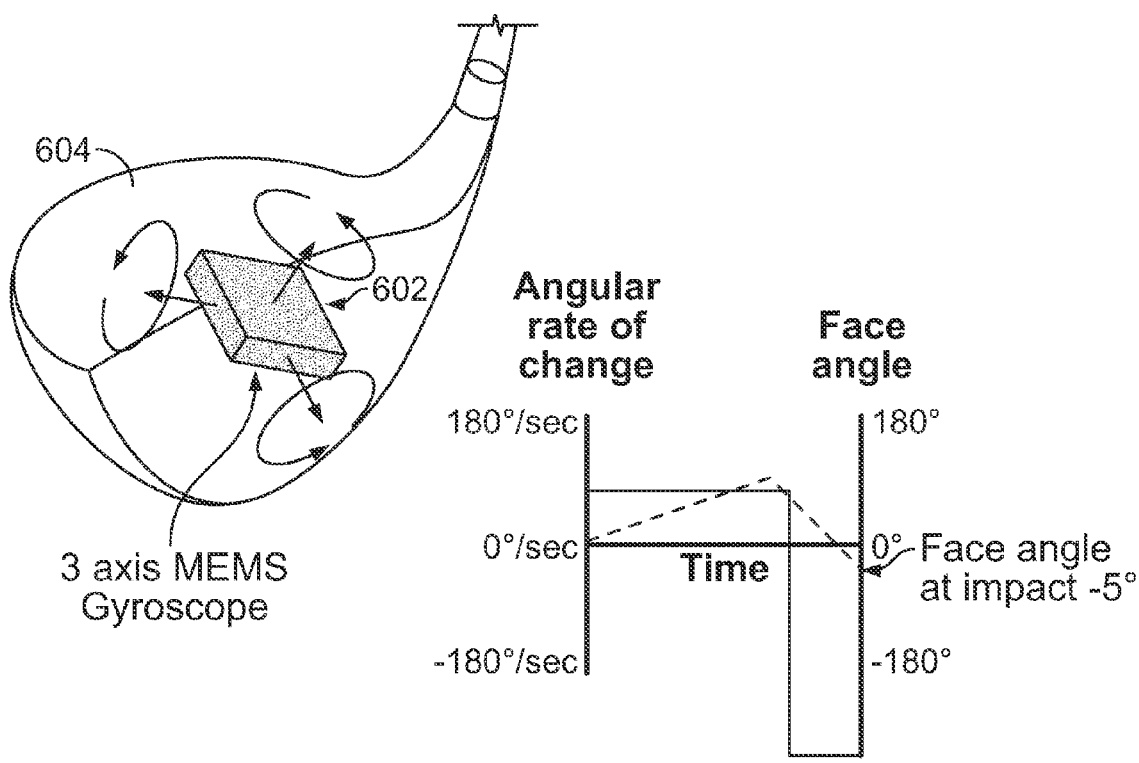
FIG. 6 illustrates an instrumented golf club that includes a gyroscope module, in accordance with an embodiment of the invention.

FIG. 6 shows an embodiment in which a gyroscope 602 is placed within a golf club head 604 to measure golf swing parameters. Gyroscope 602 may be implemented with a micro-electromechanical system (MEMS) or other device or module capable of fitting within golf club head 604. A three-axis gyroscope may be used to increase accuracy.

Gyroscope 602 may be used to determine golf swing parameters by assuming that the point of rotation is a golfer's shoulders. Club head velocity may be determined by an accelerometer that is part of the same MEMS, an external accelerometer or some other device. For golf swing parameter determination purposes, in the proximity of a ball the movement of golf club head 604 may be modeled as an object moving on the surface of a sphere. The sphere has a radius equal to the length of the club plus the length of the golfers arms. In one embodiment, a standard radius of 62.5 inches is used. In other embodiments, a golfer may provide his or her arm length and/or club length for more accurate determinations.

Figure 7:
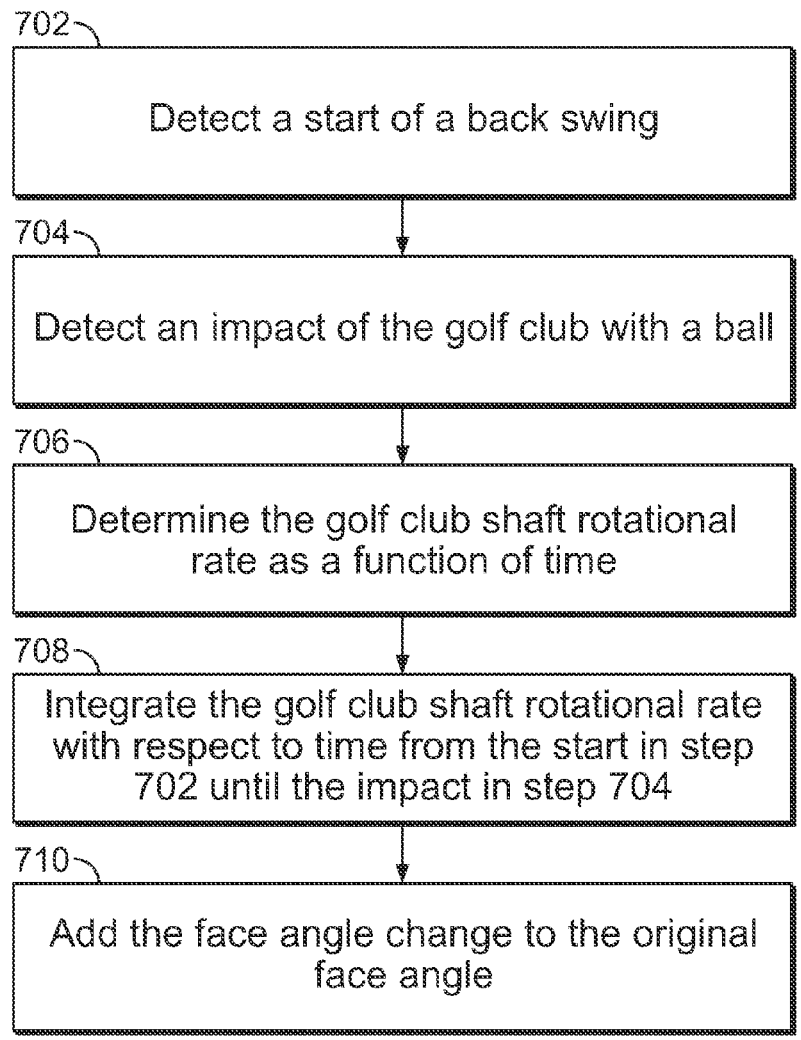
FIG. 7 illustrates a method of determining the face angle of a golf club with the use of a gyroscope, in accordance with an embodiment of the invention.

The face angle of golf club head 604 may be determined as a function of the shaft rotation rate. The shaft rotation rate may be determined by gyroscope 602. FIG. 7 illustrates one exemplary method of determining the face angle with the use of a gyroscope. First, in step 702 the start of the back swing is determined. A velocity sensor may be used to determine the start of the back swing. In step 704 impact of the golf club with a ball is detected. Step 704 may be performed by the impact sensors described above. The shaft rotational rate as a function of time may be determined by gyroscope 604 in step 706. Step 706 preferably includes determining the shaft rotational rate from at least the start in step 702 until at least the impact in step 704. Next, in step 708, the golf club shaft rotational rate is integrated with respect to time from the start in step 702 until the impact in step 704 in accordance with the following formula:

$$\text{Face Angle Change} = \int_{BackswingStart}^{Impact} \text{ShaftRotation Rate}(t)\,dt$$

The face angle is then determined by adding the face angle change to the original face angle in step 710.

Club head speed may be determined as a function of the radius (arm length plus club length) and angular velocity. In particular, the club head speed is the product of the radius and the angular velocity of golf club head 604.

Swing tempo may be determined by first determining when the angular rate is zero and begins to increase at the start of the back swing. The time of impact may then be determined by a spike in the angular rate that accompanies the impact or from one or more other sensors, such as an accelerometer or impact sensor.

Rotational velocities may also be used to determine the swing path. In one embodiment in which gyroscope 602 is implemented with a three axis gyroscope and in which the z-axis is used to determine changes in face angle, the y-axis is used to determine motion in a target reference plane and the x-axis is used to determine motion parallel to the target reference plane, the swing path may be estimated by the following formula:

$$SwingPath = \operatorname{atan}\left(\frac{xAxisRotationalVelocity}{yAxisRotationalVelocity}\right)$$

Figure 8:
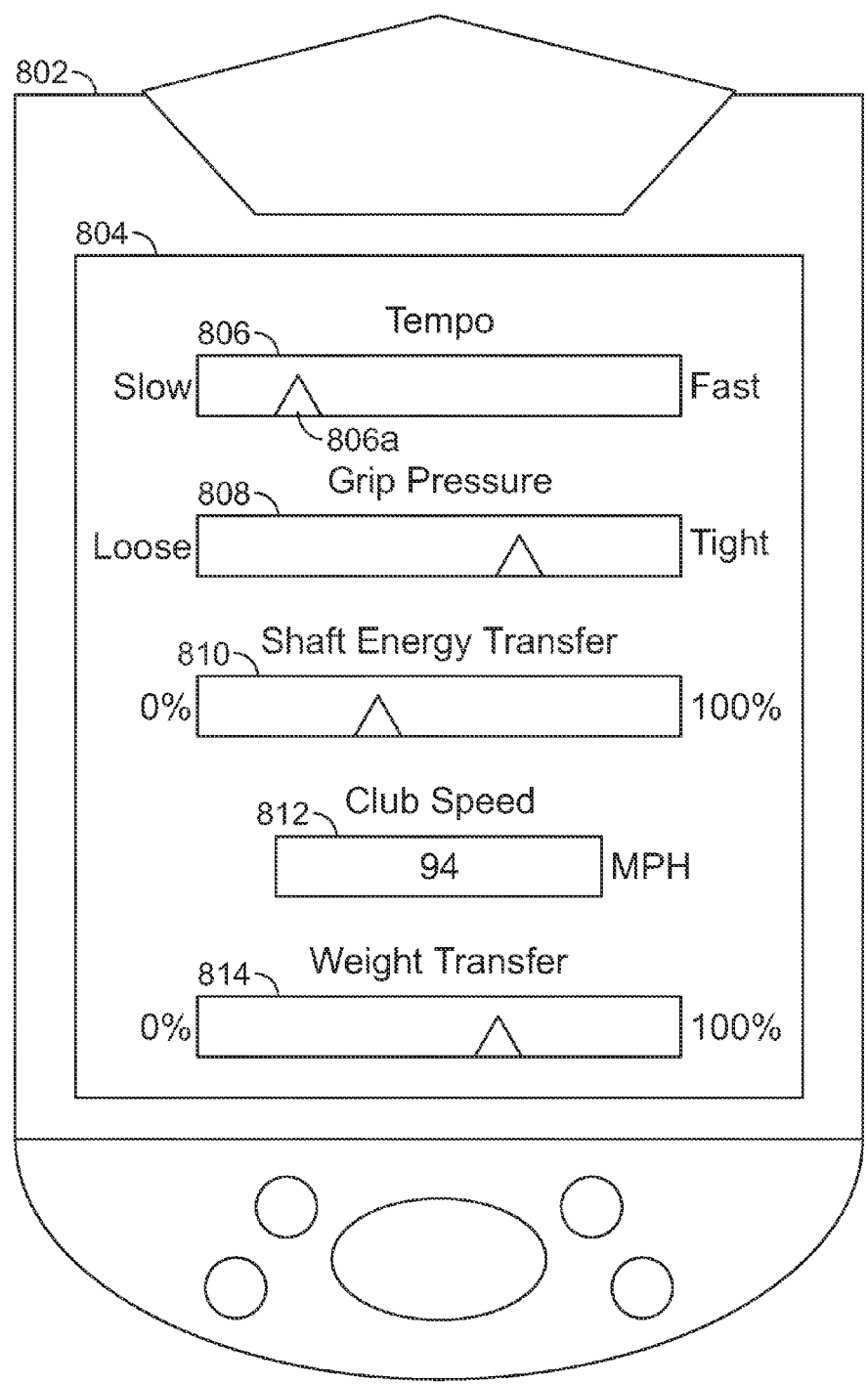
FIG. 8 illustrates a portable computer device having a graphical user interface formatted in accordance with an embodiment of the invention.

FIG. 8 illustrates a portable computer device 802 having a graphical user interface 804 formatted in accordance with an embodiment of the invention. A tempo bar 806 may be included to represent the tempo of a golf swing. The center of tempo bar 806 may correspond to an optimum tempo. A pointer 806a illustrates tempo deviation from the predetermined optimum tempo value. Optimum values for the variables illustrated with graphical user interface 804 may correspond to a particular swing selected by a golfer. For example, after hitting a long drive with a driver, the golfer may configure portable computer device 802 to use all of the variables from that golf swing as reference points. The configuration may be performed by selecting a menu option. Of course portable computer device 802 may be programmed with optimal values that are suitable for many golfers.

A grip pressure bar 808 may be included to display grip pressure relative to an optimal value. A shaft energy transfer bar 810 may be included to illustrate the deviation of shaft energy transfer from a predetermined optimal value. Shaft energy transfer is a function of the distance of the club head relative to the club shaft centerline. In one embodiment of the invention, accelerometer module 204 may be used to determine a location of the club shaft and accelerometer module 212 may be used to determine the location of the club head. The distance between the club head and club shaft centerline just prior to impact with the golf ball may be used to determine shaft energy transfer. Relative club speed and weight transfer may be displayed with menu bars 812 and 814 respectively. Weight transfer is defined as a percentage of weight that is transferred from the rear foot to the front foot during a golf swing. Of course numerous additional or alternative variables may be detected by sensors that are a part of golf club 200 (shown in FIG. 2) and those variables may be represented on graphical user interface 804.

Figure 9:
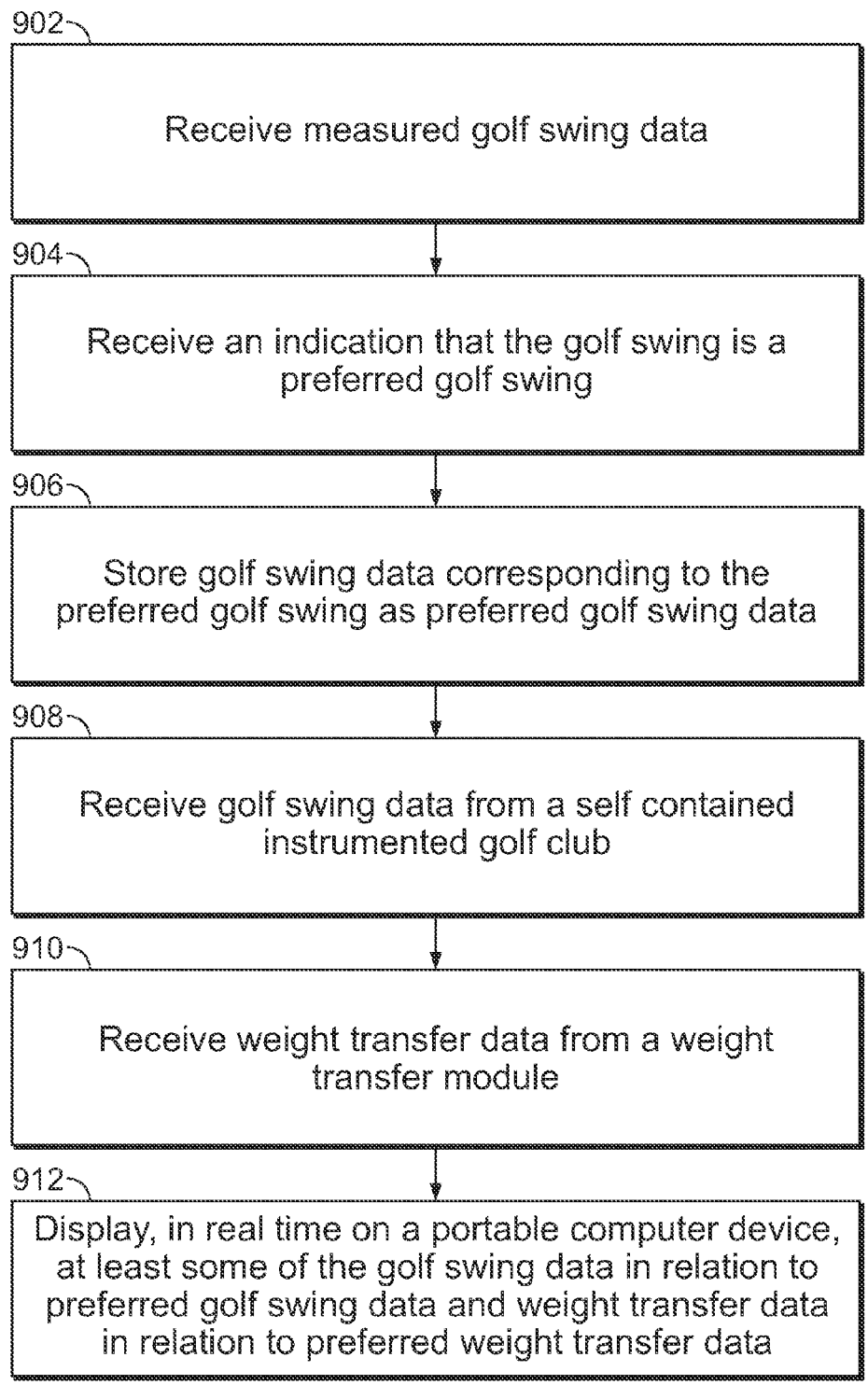
FIG. 9 illustrates a method of providing golf swing data to a golfer, in accordance with an embodiment of the invention.

FIG. 9 illustrates a method of providing golf swing data to a golfer. First, step 902 a portable computer device receives golf swing data. Step 902 may include receiving data corresponding to the golf swing from an instrumented golf club. Next, in step 904 a portable computer device receives an indication that the golf swing is a preferred golf swing. For example, after hitting a drive that the golfer is pleased with, the golfer may select an item on a user interface screen to indicate that the golf swing is a preferred golf swing. Similarly, the golfer many indicate that other golf swings are preferred golf swings for various other clubs and situations. In one embodiment, the golfer may indicate select preferred golf swings that correspond to each club the golfer carries.

Next, in step 906 the golf swing data corresponding to the preferred golf swing is stored as preferred golf swing data. The preferred golf swing data may include values of variables such as tempo, grip pressure, shaft energy transfer, club speed, club face angle, swing path, impact location and weight transfer. The preferred golf swing data may later be used as a reference when analyzing other golf swings. For example, after hitting a drive that the golfer wishes to use as a reference, a club head speed of 125 mph that was measured during the swing may be stored as a preferred value. That is, the preferred value of the club head speed parameter would be set to 125 mph. In step 908 the portable computer device may receive golf swing data from a self-contained instrumented golf club. The self-contained instrumented golf club may be similar to the golf club described above and the golf swing may be a golf swing made during an actual round of golf. The portable computer device may also receive weight transfer data from a weight transfer module in step 910. The data received in steps 908 and 910 may be received using one of the wireless transmission methods and protocols described above.

In step 912 at least some of the golf swing data and weight transfer data is displayed in real-time on a portable computer device in relation to preferred golf swing and weight transfer data. Step 912 may include displaying the data on a user interface such as the user interface shown in FIG. 8.

Figure 10:
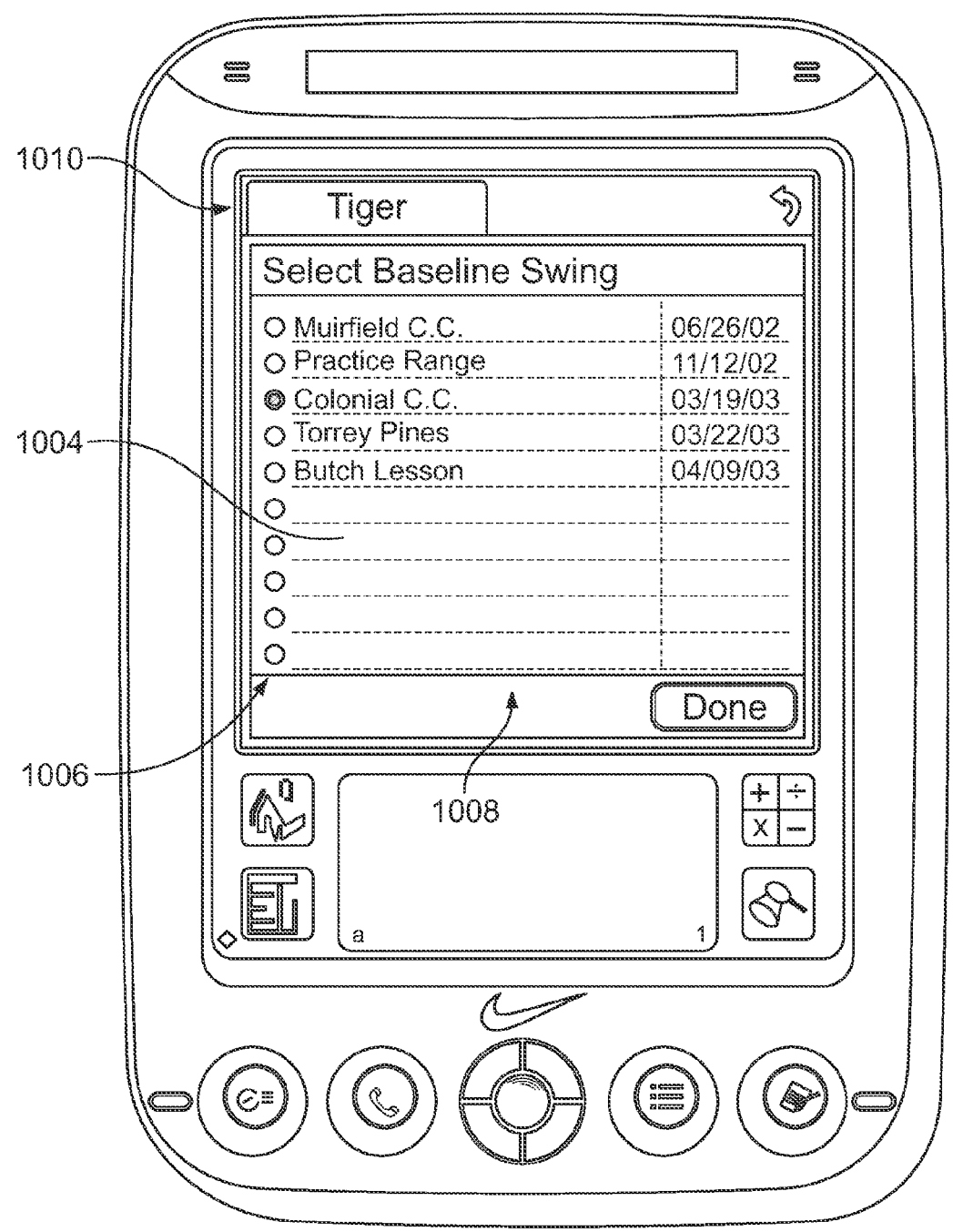
FIG. 10 illustrates a portable computer device having a graphical user interface that allows a user to select a baseline or preferred swing, in accordance with an embodiment of the invention.

One skilled in the art will appreciate that aspects of the present invention may be used in connection with several different user interfaces. FIG. 10, for example, illustrates a portable computer device 1002 having a graphical user interface 1004 that allows a user to select a baseline or preferred swing, in accordance with an embodiment of the invention. User interface 1004 allows a golfer to select a baseline swing by selecting an appropriate radio button in column 1006. The entries displayed in column 1008 may correspond to golf swings that occurred at different courses on different dates. Alternatively, a golfer may store baseline swings for different conditions or golf clubs. Exemplary entries that may be included in column 1008 include "high wind," "from fringe," "3 iron," and "Colonial CC—4$^{th}$ hole." The golfer's name may be identified in region 1010.

Figure 11:
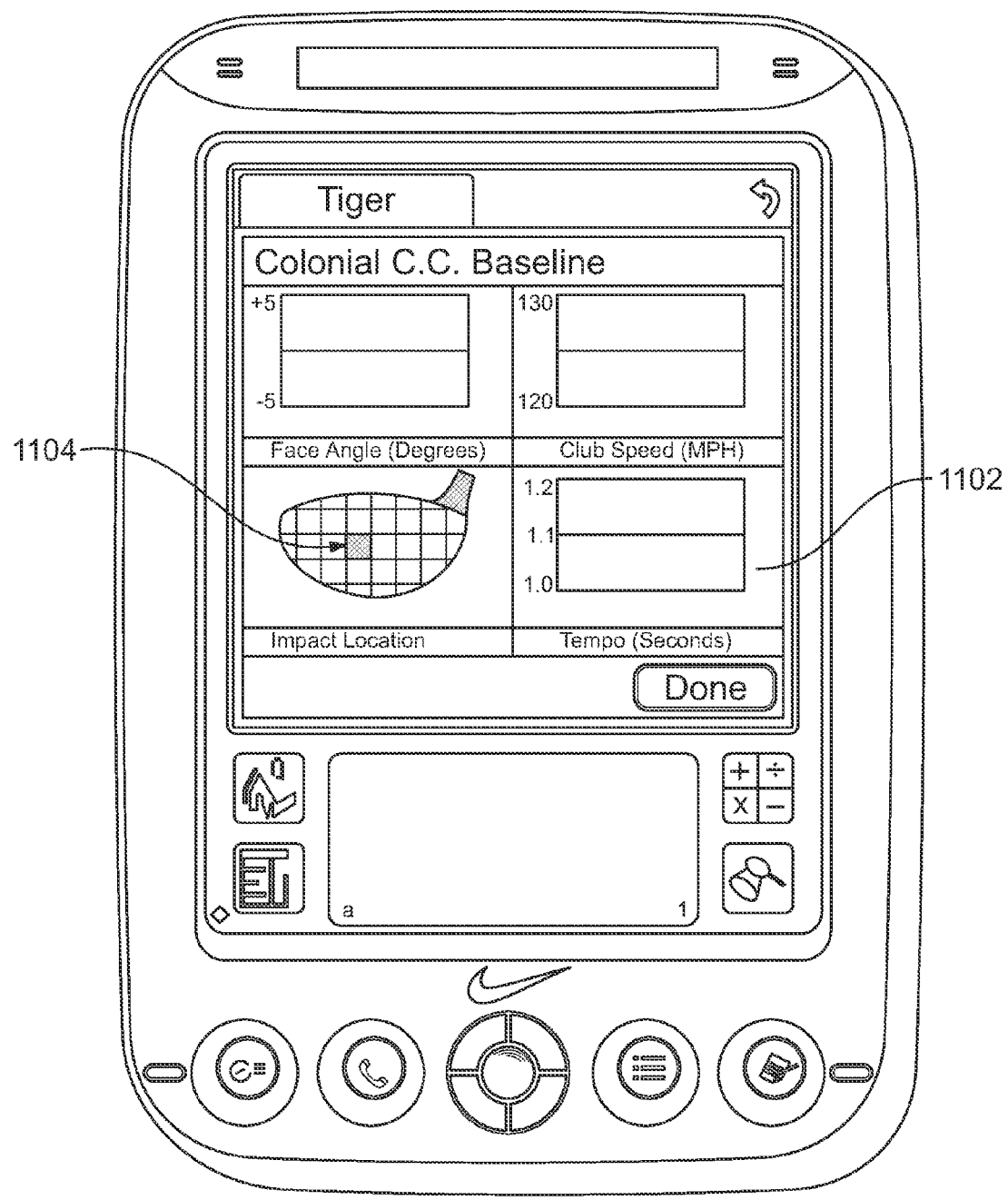
FIG. 11 illustrates a graphical user interface including baseline or preferred values in accordance with an embodiment of the invention.

After selecting a particular entry with graphical user interface 1004, a golfer may then be presented with a graphical user interface that displays baseline golf swing parameters. FIG. 11 shows graphical user interface 1102 including baseline or preferred values in accordance with an embodiment of the invention. The four parameters shown are face angle, club speed, impact location and tempo. The baseline impact location corresponds to highlighted square 1104, the baseline tempo is 1.1 seconds, etc. Of course additional or alternative parameters may be displayed. In one embodiment of the invention, the parameters displayed are a function of the entry selected.

Figure 12:
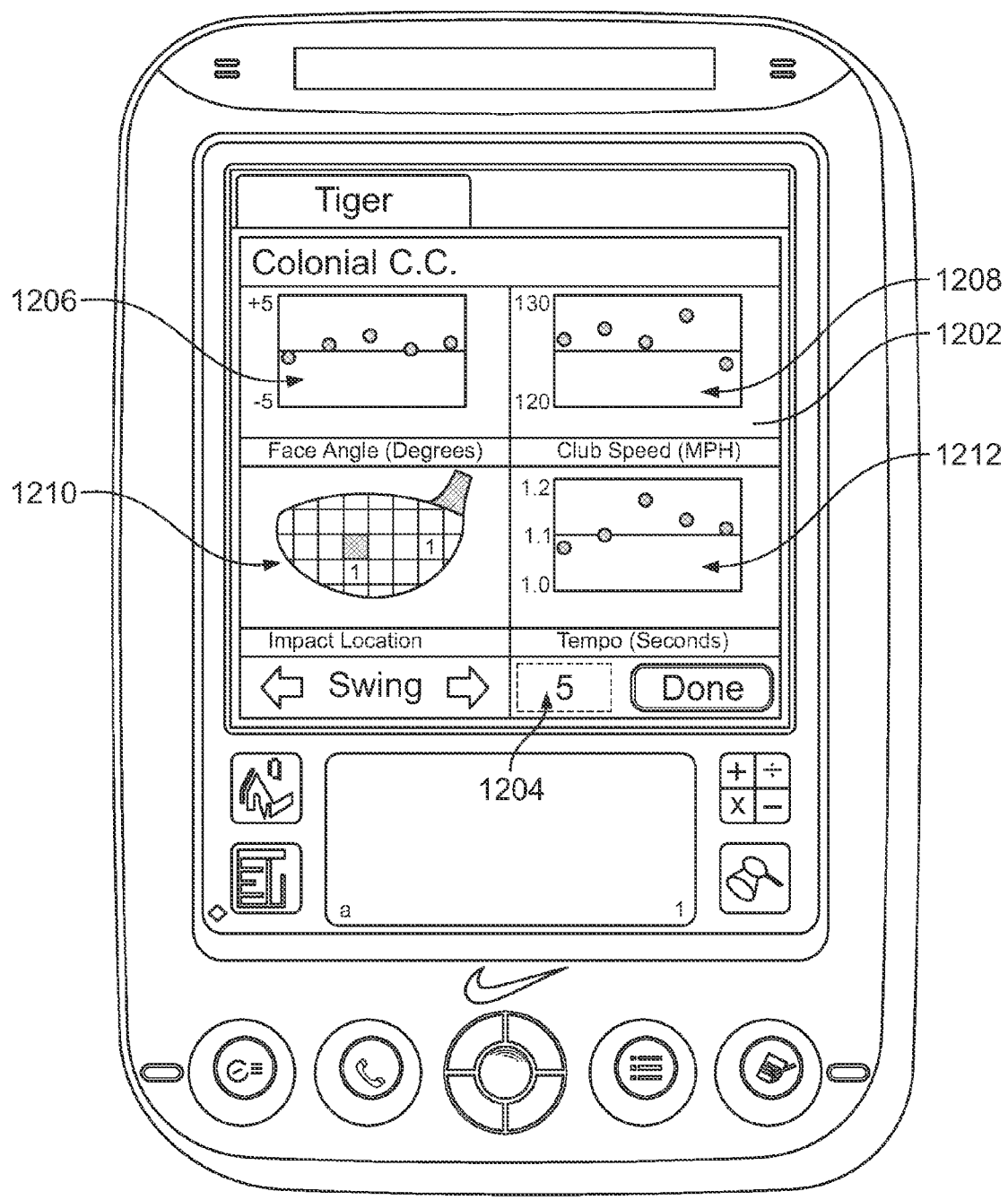
FIG. 12 illustrates a graphical user interface that displays golf swing data for one or more golf swings against baseline golf swing parameter values, in accordance with an embodiment of the invention.
Figure 13:
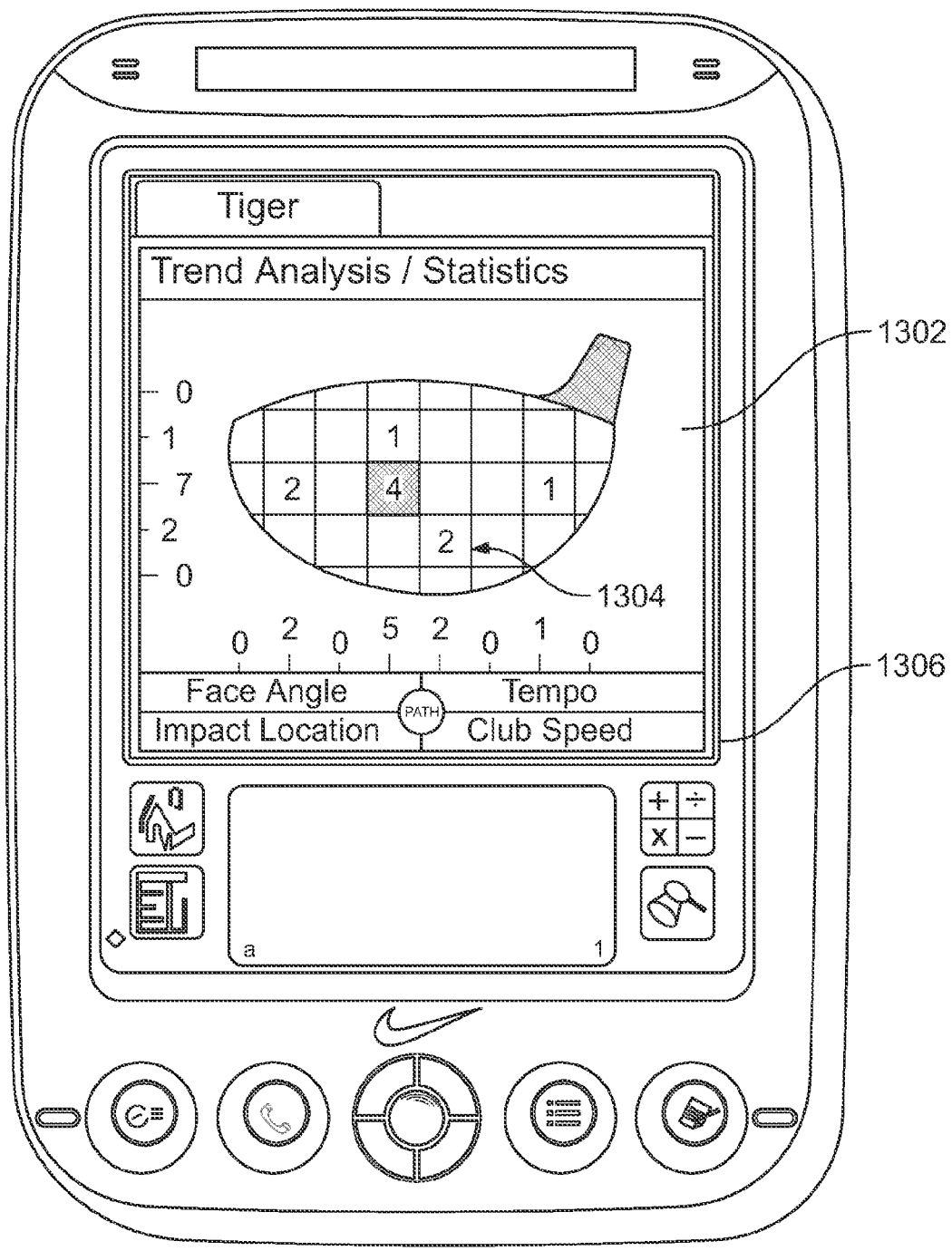
FIG. 13 illustrates a graphical user interface that includes a grid overlying the face of a golf club, in accordance with an embodiment of the invention.

FIG. 12 illustrates a graphical user interface 1202 that displays golf swing data for one or more golf swings against baseline golf swing parameter values. The number of golf swings may be displayed in region 1204. The golfer may be allowed to discard golf swing data for one or more golf swings. For example, if the golfer has a particularly bad swing the corresponding data may not be relevant and may be discarded. User interface 1202 may be configured to allow the golfer to see regions 1206, 1208, 1210 and 1212 in greater detail. For example, selecting region 1210 may cause graphical user interface 1302 (shown in FIG. 13) to be displayed.

Graphical user interface 1302 includes a grid overlying the face of a golf club. Numbers may be added to regions to indicate the number of times the regions corresponded to impact location. For example, region 1304 corresponded to the impact location during two golf swings. A data selection region 1306 may be included to allow the golfer to view other golf swing parameter values.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A self contained instrumented golf club, the golf club comprising:
   a first accelerometer module removably mounted in a head of the golf club; and
   a second accelerometer module mounted in a shaft of the golf club; and
   an antenna that comprises a ferrule that connects the head of the golf club to the shaft of the golf club for transmitting swing data to a portable computer device.

2. The instrumented golf club of claim 1, wherein the weight of the first accelerometer and the second accelerometer do not change the balance or center of gravity of the club.

3. The instrumented golf club of claim 2, wherein the head of the golf club is a wood.

4. The instrumented golf club of claim 2, wherein the head of the golf club is an iron.

5. The instrumented golf club of claim 1, wherein the first accelerometer module senses acceleration along three orthogonal axes.

6. The instrumented golf club of claim 1, further including an impact module configured to sense the location of impact with a golf ball.

7. The instrumented golf club of claim 6, wherein the impact module comprises an array of strain gauges.

8. The instrumented golf club of claim 6, further including a grip pressure sensor.

9. The instrumented golf club of claim 1, further including a transmission module that wirelessly transmits golf swing data.

10. A computer-readable medium containing computer executable instructions for causing a transmission module embedded within a golf club to perform the steps of:
    receiving first golf swing data from a first accelerometer module removably mounted in a head of the golf club;

receiving second golf swing data from a second accelerometer module mounted in a shaft of the golf club; and transmitting the first and second golf swing data to a portable computer device using an antenna that comprises a ferrule that connects a head of the golf club to a shaft of the golf club.

11. The computer-readable medium of claim 10, further including computer-executable instructions for causing the transmission module to perform the steps of:

receiving ball impact location data from an impact module; and transmitting the ball impact location data.

12. The computer-readable medium of claim 11, further including computer-executable instructions for causing the transmission module to perform the steps of:

receiving grip pressure data from a grip pressure sensor; and transmitting the grip pressure data.

13. A self contained instrumented golf club, the golf club comprising:

a first accelerometer module mounted in a head of the golf club;

a second accelerometer module mounted in a shaft of the golf club; and an antenna that comprises a ferrule that connects the head of the golf club to the shaft of the golf club for transmitting swing data to a portable computer device.

* * * * *

UNITED STATES PATENT AND TRADEMARK OFFICE
CERTIFICATE OF CORRECTION

| | | |
|---|---|---|
| PATENT NO. | : 7,736,242 B2 | Page 1 of 1 |
| APPLICATION NO. | : 10/806508 | |
| DATED | : June 15, 2010 | |
| INVENTOR(S) | : John T. Stites et al. | |

It is certified that error appears in the above-identified patent and that said Letters Patent is hereby corrected as shown below:

On the Title Page, Inventors (75), Inventor Jeffrey A. Hadden:
Please delete "Columbus, OH" and insert --Worthington, OH--.

On the Title Page, Inventors (75), Inventor Garrick L. Maenle:
Please delete "Meanle" and insert --Maenle--.

Signed and Sealed this

Twenty-third Day of November, 2010

David J. Kappos
*Director of the United States Patent and Trademark Office*